(12) United States Patent
He et al.

(10) Patent No.: US 9,436,244 B2
(45) Date of Patent: Sep. 6, 2016

(54) ADAPTIVE CONTROL LOOP PROTECTION FOR FAST AND ROBUST RECOVERY FROM LOW-POWER STATES IN HIGH SPEED SERIAL I/O APPLICATIONS

(71) Applicant: Intel Corporation, Santa Clara, CA (US)

(72) Inventors: Yun He, Santa Clara, CA (US); Narender R. Nagulapally, Folsom, CA (US); Sanjib Sarkar, Folsom, CA (US); Ivan Herrera Mejia, Folsom, CA (US); Ruchira K. Liyanage, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 13/831,892

(22) Filed: Mar. 15, 2013

(65) Prior Publication Data

US 2014/0281668 A1    Sep. 18, 2014

(51) Int. Cl.
  *G06F 1/32*     (2006.01)
  *G06F 1/26*     (2006.01)
  *G06F 11/07*    (2006.01)
  *G06F 1/00*     (2006.01)

(52) U.S. Cl.
  CPC ............... *G06F 1/26* (2013.01); *G06F 1/3253* (2013.01); *G06F 11/0706* (2013.01); *G06F 11/0754* (2013.01); *G06F 11/0793* (2013.01); *G06F 1/00* (2013.01); *Y02B 60/1235* (2013.01)

(58) Field of Classification Search
  CPC ............... G06F 1/26; G06F 1/32; G06F 1/28
  USPC ....... 713/300, 310, 320, 321, 322, 323, 324, 713/330, 340, 375
  See application file for complete search history.

(56) References Cited

U.S. PATENT DOCUMENTS 6,377,666 B1 *  4/2002  Cheng et al. ............... 379/93.06
6,510,525 B1 *  1/2003  Nookala et al. ............... 713/324
6,938,040 B2 *  8/2005  Allison et al.
(Continued)

FOREIGN PATENT DOCUMENTS

CN        102929769 A    2/2013

OTHER PUBLICATIONS

Spagna et al., "ISSCC 2010/Session 20/Next-Generation Optical & Electrical Interfaces/20.4", A 78mW 11.8Gb/s Serial Link Transceiver with Adaptive RX Equalization and Baud-Rate CDR in 32nm CMOS, 2010 IEEE International Solid-State Circuits Conference, Digest of Technical Papers, Feb. 10, 2010, 3 pages.

(Continued)

*Primary Examiner* — Jaweed A Abbaszadeh
*Assistant Examiner* — Keshab Pandey
(74) *Attorney, Agent, or Firm* — Alpine Technology Law Group LLC

(57) ABSTRACT

Methods and apparatus related to adaptive control loop protection for fast and robust recovery from low-power states in high speed serial I/O applications are described. In some embodiments, a first bit pattern is detected, at a first agent, that indicates a speculative entry by a second agent into a low power consumption state and one or more control loops are frozen. A second bit pattern is detected (after entering the low power consumption state) that indicates exit from the low power consumption state by the second agent and the one or more control loops are unfrozen (e.g., in a specific order). Other embodiments are also claimed and/or disclosed.

27 Claims, 6 Drawing Sheets

(56) References Cited

U.S. PATENT DOCUMENTS

| | | | |
|---|---|---|---|
| 7,454,631 B1* | 11/2008 | Laudon et al. | 713/300 |
| 7,502,635 B1* | 3/2009 | Horikoshi et al. | 455/574 |
| 7,925,913 B1* | 4/2011 | Vijayaraghavan | G06F 13/4295 375/355 |
| 8,549,205 B1* | 10/2013 | Harriman | G06F 13/4027 370/254 |
| 8,812,878 B2* | 8/2014 | Tan et al. | 713/300 |
| 2003/0042288 A1 | 3/2003 | Spear et al. | |
| 2006/0045217 A1* | 3/2006 | Moughabghab | H04L 25/03076 375/345 |
| 2007/0150762 A1* | 6/2007 | Sharma | G06F 1/3203 713/300 |
| 2010/0153589 A1* | 6/2010 | Maroni et al. | 710/18 |
| 2010/0330927 A1* | 12/2010 | Cherukuri et al. | 455/68 |
| 2012/0082463 A1* | 4/2012 | Kasprzyk | H04B 10/40 398/140 |

OTHER PUBLICATIONS

Office Action received for Korean patent application No. 10-2014-31163, mailed on Mar. 18, 2015.

Office Action received for Korean Patent Application No. 10-2014-0031163, mailed on Sep. 23, 2015, 5 pages including 1 page of English translation.

Office Action received for Chinese Patent Application No. 201410098134.1, mailed on Jul. 1, 2015, 12 pages.

Office Action received for Korean Patent Application No. 10-2014-0031163, mailed on Mar. 28, 2016, 5 pages including 1 page of English translation.

Office Action received for Chinese Patent Application No. 201410098134.1, mailed on Mar. 7, 2016, 10 pages.

\* cited by examiner

ADAPTIVE CONTROL LOOP PROTECTION FOR FAST AND ROBUST RECOVERY FROM LOW-POWER STATES IN HIGH SPEED SERIAL I/O APPLICATIONS

FIELD

The present disclosure generally relates to the field of electronics. More particularly, an embodiment of the invention relates to adaptive control loop protection for fast and robust recovery from low-power states in high speed serial link I/O applications.

BACKGROUND

One common Input/Output (I/O or IO) interface used in computer systems is Peripheral Component Interconnect express (PCIe). As PCIe speeds are increased, however, some resulting signal distortion reduces signal communication reliability. For example, PCIe links with high data transfer rates may generally use a self-corrective feedback control loop to control analog receiver circuits. However, noisy data input may occur at entry of and exit from a power state, which would cause the feedback control loop to react and may unsettle it to values that are not optimal for an electrically robust link.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
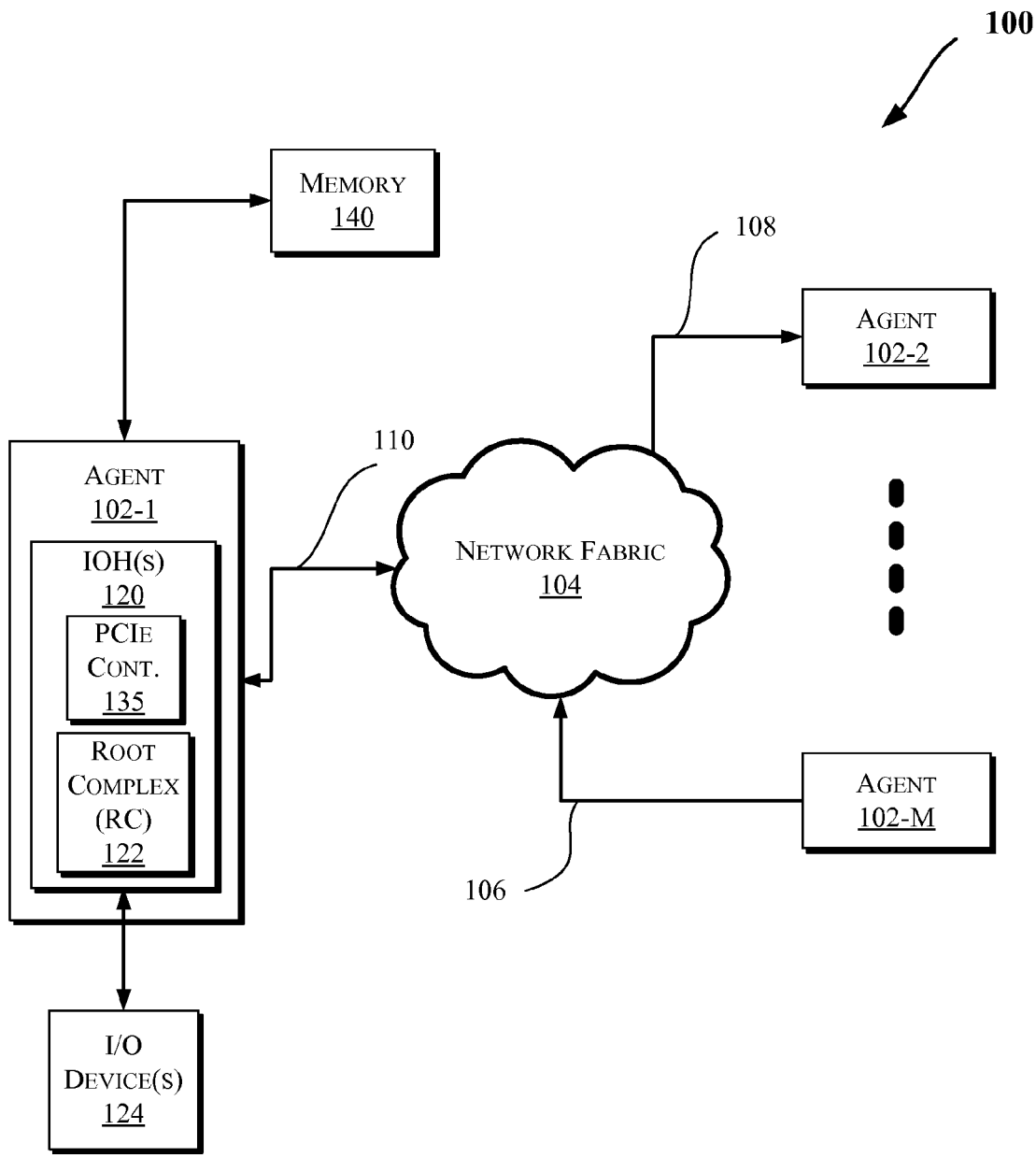
FIG. 1 illustrates a block diagram of an embodiment of a computing system including PCIe devices and or other I/O devices, which can be utilized to implement one or more embodiments discussed herein.

In the following description, numerous specific details are set forth in order to provide a thorough understanding of various embodiments. However, some embodiments are practiced without the specific details. In other instances, well-known methods, procedures, components, and circuits have not been described in detail so as not to obscure the particular embodiments. Various aspects of embodiments of the invention are performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

PCIe Gen3 (where PCIe refers to PCI express, which may be in accordance with PCIe Base Specification Revision 3.0 (e.g., version 1.0, Nov. 10, 2010)) and other serial I/O's with high data transfer rates use self-corrective feedback control loops to control analog receiver circuits. During full link training in the beginning, these loops go through acquisition to settle to optimal start values for link to function electrically in a robust manner. Once a link is out of training and fully functional, control loops continuously correct analog circuits to sample the incoming data within bit error rate requirement. However, noisy data input, for example, may potentially happen at the entry and exit of a power state, and would cause the feedback control loops to react and may unsettle them to values that are not optimal for an electrically robust link. It is extremely important for these kinds of receivers to have an accurate solution to prevent the loops from being exposed to any kind of noisy data like what may happen during the entry and exit of link power management states.

In the legacy Gen1 and Gen2 PCIe designs, complex analog squelch circuits generally provide a reliable way of detecting entry into lower power management state (squelch) to protect loops from noisy squelch data. In high speed Gen3 PCIe design (or even in some PCIe Gen2 designs), reliable analog indication of entry into power state at 8 GT/s and above is not feasible due to complex inter-symbol interference (ISI) and small signal amplitude. In these high speed designs, analog indication is replaced with digital way of decoding and detection of an EIOS (Electronic Idle Ordered Set) bit pattern indicating intent to enter into a lower power state. Controller in the receiver PHY layer processes this EIOS pattern and sends indication to Analog Front End (or AFE, which includes analog circuits that receive incoming analog signals and resolve them to receive data in binary format; and convert binary transmit data into analog signals to send over PCIe link to link partner devices).

A PCIe link partner (such as controller 135 of FIG. 1) may send a signal to root-complex receiver that indicates entry to a lower power state, e.g., L0s (where L0s generally refers to power savings state) that is relatively short duration idle mode with expectation of fast wake-up. Root-complex receiver uses this signal for entering a lower power state like L0s and in turn sends indication to AFE to shut-off (or make idle) appropriate analog circuits. But, the current way of digital detection and L0s solution takes a significantly long time. Link-partner may enter squelch mode during this time and start sending squelch data, exposing the loops to squelch data, e.g., for 50 to 100 ns depending on Gen3 or Gen2 data-rates for processing the EIOS data in order to confirm entry in to low power-state. And also in many boundary logic conditions, loop will be exposed to noisy data during squelched condition for a longer period, as there may not be reliable indication from the controller about entry into a lower power state. For example, when the link is in recovery sub-states, EIOS detection to LTSSM (Link Training and Status State Machine) is masked, and the controller may not send the L0s entry signal to AFE and that would result in corrupting loops to drift to a non-optimal position that may not be recoverable. Under such conditions the AFE receiver may become exposed to noisy signals and common-mode jumps and the control loops try to correct for these and settle down to values that may be completely suboptimal for regular data traffic. This may cause link failure(s) after the receiver exits the lower power state.

This situation can be partially mitigated by increasing the length and duration of nFTS (the number of Fast Training Sequences required to assist AFE receiver to achieve bit lock) patterns at the exit from the lower power state, but this may severely reduce the power and performance benefits as the overall exit latency increases. Such exit latency increase takes away the time that can be spent in the lower power state which reduces power management benefits/efficiency. For many applications and workloads, there can be repeated back-to-back entry to and exits from lower power states. In these cases, the problem can manifest in an even more severe form and even with longer nFTS, and the receiver may encounter burst errors. Hence, if the issue is not addressed, products with PCIe Gen3 capable circuit architecture would face: (i) link degradation or link failure after exit from a lower power state; and/or (ii) reduction in power and performance benefit as exit latency would be longer.

Moreover, the symptoms of receiver recovery problems may include:

(a) nFTS timeout and link entering recoveries on L0s exit;

(b) Scenarios of Sudden Link Downs (SLDs) where controller do not assert RX_L0s (Receive L0s) on EIOS. It results in AFE RX loops being exposed to squelch data for a relatively long time, which eventually corrupts adaptive loops beyond self-recovery;

(c) Slow degradation of link performance on back-to-back L0s events. It is due to the noisy data at the beginning of a low power state exit which could cause the receiver adaptive loop to drift, and the L0 residency time is not long enough for the receiver to fully recover before entering the next L0s state.

To this end, in some embodiments, a controller (e.g., PCIe controller 135 of FIG. 1) processes EIOS in a special way to generate a relatively early indication that an end point (or agent) is entering a lower power state (e.g., by decoding COM IDLE IDLE IDLE in Gen1/Gen2 and first 4 EIOS symbols in Gen3). This early EIOS is a potential indication that root complex could enter into L0s state but it could drop EIOS and stay in L0 state in some boundary cases. AFE uses this early EIOS indication to cause freezing of the control loops (and also arm the analog squelch exit detection logic to detect the squelch exit from the low power state). This freeze mechanism will prevent the control loops from reacting to noisy squelch data after a link-partner completes transmission of EIOS. It may take a significant amount of time (e.g., up to 100 ns) for a controller to process the EIOS data in order to confirm entry in to low power-state. If the normal L0s entry signal is used, the adaptive loops may be exposed to squelch data for the controller processing latency each time it enters L0s state. An analog squelch exit signal is then sampled/detected after a delay period (e.g., a programmable analog squelch circuit warm up time, such as 20 ns, 40 ns or 80 ns) from freeze indication to detect an un-squelched state. The control loops would then be unfrozen in response to a change to the analog squelch exit signal (e.g., when it is asserted after the programmable warm up timer).

Moreover, the early EIOS indication from the controller may not always result in LTSSM entering ASPM L0s state. In these speculative cases, the control loops are opened up (i.e., unfrozen) as squelch exit would be indicated eventually (e.g., based on detection of an EIEOS (Electronic Idle Exit Ordered Set) bit pattern). In case that the end point (or agent) exits the low power state shortly after entry (for example, the PCIe specification defines 20 ns minimum L0s residency), the adaptive control loops would also be enabled after some delay (e.g., 40 ns or 80 ns warm up time) in response to an indication of squelch exit. Hence, the speculative control loop freeze before low-power state entry would not lock the loops prematurely due to the built-in fail-safe mechanism.

Various embodiments are discussed herein with reference to a computing system component, such as the components discussed herein, e.g., with reference to FIGS. 1-2 and 4-5. More particularly, FIG. 1 illustrates a block diagram of a computing system 100, according to an embodiment of the invention. The system 100 includes one or more agents 102-1 through 102-M (collectively referred to herein as "agents 102" or more generally "agent 102"). In an embodiment, the agents 102 are components of a computing system, such as the computing systems discussed with reference to FIGS. 2 and 4-5.

As illustrated in FIG. 1, the agents 102 communicate via a network fabric 104. In an embodiment, the network fabric 104 can include one or more interconnects (or interconnection networks) that communicate via a serial (e.g., point-to-point) link and/or a shared communication network. Each link may include one or more lanes. For example, some embodiments can facilitate component debug or validation on links that allow communication with fully buffered dual in-line memory modules (FBD), e.g., where the FBD link is a serial link for coupling memory modules to a host controller device (such as a processor or memory hub). Debug information is transmitted from the FBD channel host such that the debug information is observed along the channel by channel traffic trace capture tools (such as one or more logic analyzers).

In one embodiment, the system 100 can support a layered protocol scheme, which includes a physical layer, a link layer, a routing layer, a transport layer, and/or a protocol layer. The fabric 104 further facilitates transmission of data (e.g., in form of packets) from one protocol (e.g., caching processor or caching aware memory controller) to another protocol for a point-to-point network. Also, in some embodiments, the network fabric 104 can provide communication that adheres to one or more cache coherent protocols.

Furthermore, as shown by the direction of arrows in FIG. 1, the agents 102 transmit and/or receive data via the network fabric 104. Hence, some agents utilize a unidirectional link while others utilize a bidirectional link for communication. For instance, one or more agents (such as agent 102-M) transmit data (e.g., via a unidirectional link 106), other agent(s) (such as agent 102-2) receive data (e.g., via a unidirectional link 108), while some agent(s) (such as agent 102-1) both transmit and receive data (e.g., via a bidirectional link 110).

Also, in accordance with an embodiment, one or more of the agents 102 include one or more Input/Output Hubs (IOHs) 120 to facilitate communication between an agent (e.g., agent 102-1 shown) and one or more Input/Output ("I/O" or "IO") devices 124 (such as PCIe I/O devices). The IOH 120 includes a Root Complex (RC) 122 (that includes one or more root ports) to couple and/or facilitate communication between components of the agent 102-1 (such as a processor, memory subsystem, etc.) and the I/O devices 124 in accordance with PCIe specification (e.g., in accordance with PCI Express Base Specification 3.0, also referred to as PCIe 3.0 or PCI Gen3 or PCIe Gen3). In some embodiments, one or more components of a multi-agent system (such as processor core, chipset, input/output hub, memory controller, etc.) include the RC 122 and/or IOHs 120, as will be further discussed with reference to the remaining figures.

Additionally, the agent 102 includes a PCIe controller 135 to manage various operations of a PCIe interface including, for example, to improve the quality and/or speed of high-speed (e.g., serial) I/O channels of PCIe components in the agent 102. Further, as illustrated in FIG. 1, the agent 102-1 has access to a memory 140. As will be further discussed with reference to FIGS. 2-5, the memory 140 stores various items including for example an OS, a device driver, etc.

Figure 2:
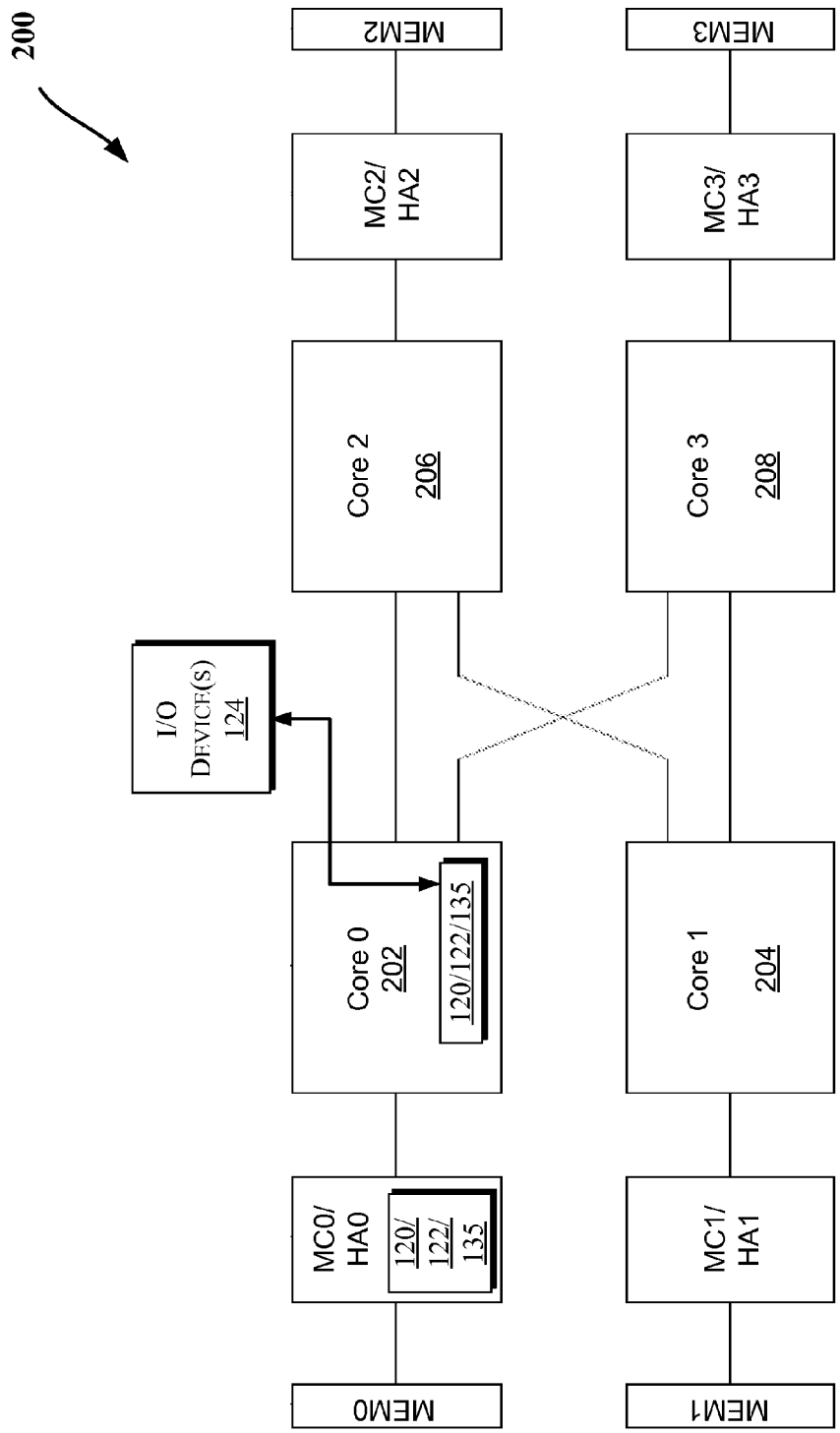
FIG. 2 illustrates a block diagram of an embodiment of a computing system, which can be utilized to implement one or more embodiments discussed herein.

More specifically, FIG. 2 is a block diagram of a computing system 200 in accordance with an embodiment. System 200 includes a plurality of sockets 202-208 (four shown but some embodiments can have more or less socket). Each socket includes a processor and one or more of IOH 120, RC 122, and PCIe Controller 135. In some embodiments, IOH 120, RC 122, and/or PCIe Controller 135 can be present in one or more components of system 200 (such as those shown in FIG. 2). Further, more or less 120, 122, and/or 135 blocks are present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 412 of FIG. 4). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Generally, processing/caching agents send requests to a home node for access to a memory address with which a corresponding "home agent" is associated. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3A:
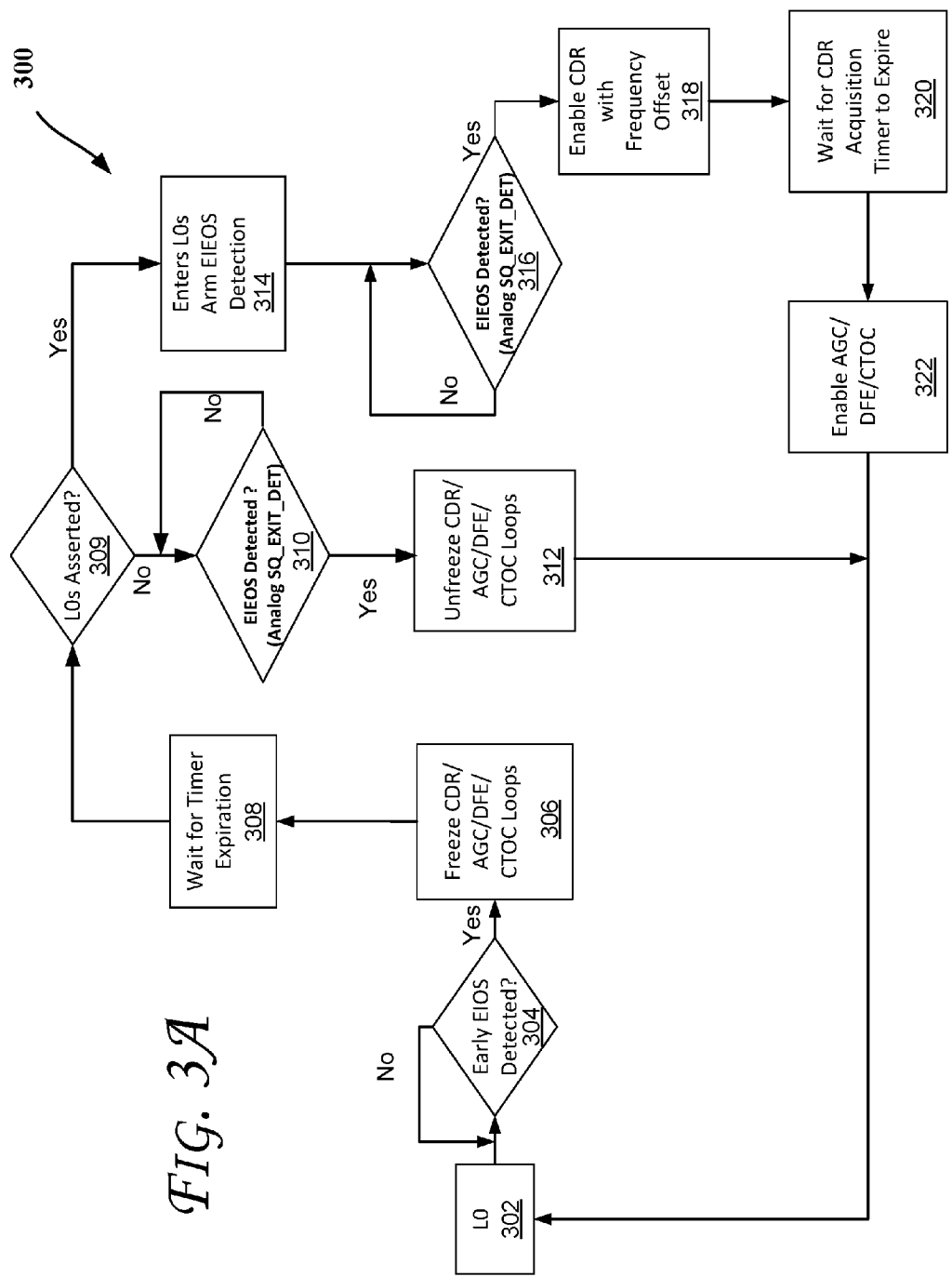
FIG. 3A illustrates a flow diagram of a method, according to an embodiment.

FIG. 3A illustrates a flow diagram of a method 300 to provide adaptive control loop protection for fast and robust recovery from low-power states in high speed serial I/O link applications, according to some embodiments. In various embodiments, the operations discussed with reference to FIG. 3A are performed by one or more of the components discussed with reference to FIGS. 1, 2, 4, and/or 5 (such as PCIe controller 135 or one or more logic within the controller 135, etc.).

Referring to FIGS. 1-3A, at an operation 302, a link between two agents (e.g., any of the agents discussed with reference to FIG. 1, such as the agent 102-1 and one of the I/O devices 124 (including an end point of a PCIe link)) is in a normal, operating state (L0). At an operation 304, an early EIOS pattern is detected (e.g., by PCIe controller 135). Once the early EIOS pattern is detected, one or more control loops (such as one or more of CDR (Clock Data Recovery, which may infer a clock, at least in part, based on analysis of the corresponding data), AGC (Automatic Gain Control, which may utilize a feedback loop to adjust gain to an appropriate level), DFE (Decision Feedback Equalization, which may provide equalization/adaptation to time-varying properties like inter-symbol-interference of the communication link), and CTOC (Continuous Time Offset Cancellation, which may provide for linear common mode error detection and offset correction) in accordance with some embodiments) are speculatively frozen at an operation 306. In an embodiment, state and/or other information relating to the control loops are saved at operation 306 (e.g., for faster recovery from the freeze). At an operation 308, method 300 waits for a first timer to expire (e.g., after 20 ns or 40 ns or 80 ns). This timer ensures that analog squelch-exit-detection circuit in AFE is sufficiently warmed-up for exit detection. Once the first timer expires, an operation 310 (after operation 309) checks squelch-exit-detection circuit to determine whether a lower power consumption state has been asserted/entered. If not, the frozen loops of operation 306 are unfrozen at an operation 312 and the link returns to a normal, operating state at operation 302.

Accordingly, at the entry into a low-power state, an embodiment uses an early speculative indication of an imminent lower-power state entry (e.g., based on the EIOS pattern detected by the PCIe controller 135) to store the control loop states and freeze the loops, so that these loops cannot become corrupted during the rest of the entry process and during the low-power state. If a false squelch happens and the receiver is still in operation mode, all the loops will quickly go back to normal operation as illustrated in the FIG. 3A block diagram.

If the lower power consumption is in fact asserted, as detected at operation 309, the link enters the low power consumption state and EIEOS pattern detection is activated at an operation 314. Once an EIEOS pattern is detected at an operation 316, the CDR loop is enabled at an operation 318 (as will be further discussed below). At an operation 320, method 300 waits for a second timer expiration to allow for the CDR acquisition prior to enabling the remaining loops (e.g., AGC, DFE, and CTOC loops) at operation 322. This approach prevents error propagation in adaptive loops due to initially corrupted data at the beginning of low-power state exits; hence, improve both link stability and the overall bit lock time. After operation 322, method 300 resumes with operation 302.

In an embodiment, freezing of the one or more loops at operation 306 is performed in the following order: CDR loop, DFE loop, AGC loop, and CTOC loop. However, all embodiments are not limited to this order for freezing of the one or more loops. Additionally, in one embodiment, unfreezing of the one or more loops at operations 318 and 322 is performed in the following order: CDR loop, DFE loop, AGC loop, and CTOC loop. However, all embodiments are not limited to this order for unfreezing of the one or more loops, except that CDR loop unfreezing (and wait for CDR acquisition at operation 320) are to occur prior to unfreezing the remaining loops.

In some embodiments, a (e.g., digital) Finite State Machine (FSM) is used to: (a) save receiver AFE control loop states (e.g., for CDR, AGC, DFE, and CTOC loops) before entering power saving states, using a speculative entry signal based on EIOS pattern. Unfreeze loops back to normal operation if the speculative entry is not detected after expiration of a first timer; and/or (b) step by step enabling all the loops after exiting power saving states.

In an embodiment, PCIe controller or a system agent will detect the early indication of EIOS that link is potentially going into a power management state and incoming data will soon be squelched. This early indication is sent to AFE to freeze the control loops (e.g., CDR, AGC, DFE and CTOC) and not to react to incoming data, and also arm squelch exit detection logic at same time. Warm up timer will start after arming the squelch logic. Timer will expire after 20 ns/40 ns/80 ns (which may be programmable) of squelch arming. After timer expires, analog squelch exit signal is sampled for valid analog squelch exit. When the valid squelch exit is detected, CDR will unfreeze first and start the Acquisition (ACQ) cycle from last frozen codes. After the CDR, ACQ cycle is complete, AGC, DFE, and CTOC will unfreeze and start tracking from last snapshot codes prior to the freeze. Normal link operation (e.g., full exit from power management mode) will resume from the point of AGC, DFE and CTOC unfreeze after operation 322.

Moreover, in some embodiments, an FSM is used to unfreeze control loops in a staggered sequence when exiting low-power states (such as L0s). The clock recovery (CDR) loop will unfreeze first. AGC, DFE, and CTOC loops will not unfreeze until CDR acquisition is completed.

For example, phase drift can occur during the residency of the low power states such as L0s. At the exit of low power states, the receiver sampling clock is no longer aligned with the incoming data. AGC, DFE and CTOC loops would drift to erroneous directions if they are enabled at the same time of the CDR loop. Furthermore, the erroneous drift of the adaptive loops could interact with each other and potentially reach to a non-recoverable state, causing link failure. This approach prevents error propagation in adaptive loops due to initially corrupted data at the beginning of low-power state exits; hence, improve both link stability and the overall bit lock time.

Under certain scenarios, the CDR may operate in a slow responsive phase region when receiver just exits the lower power states. It can be caused by large transmit phase drift and or common mode drift, such that the CDR phase detector is in a dead zone. An FSM is used to inject an artificial frequency offset to pull out the dead zone and assist fast sampling phase recovery.

Figure 3B:
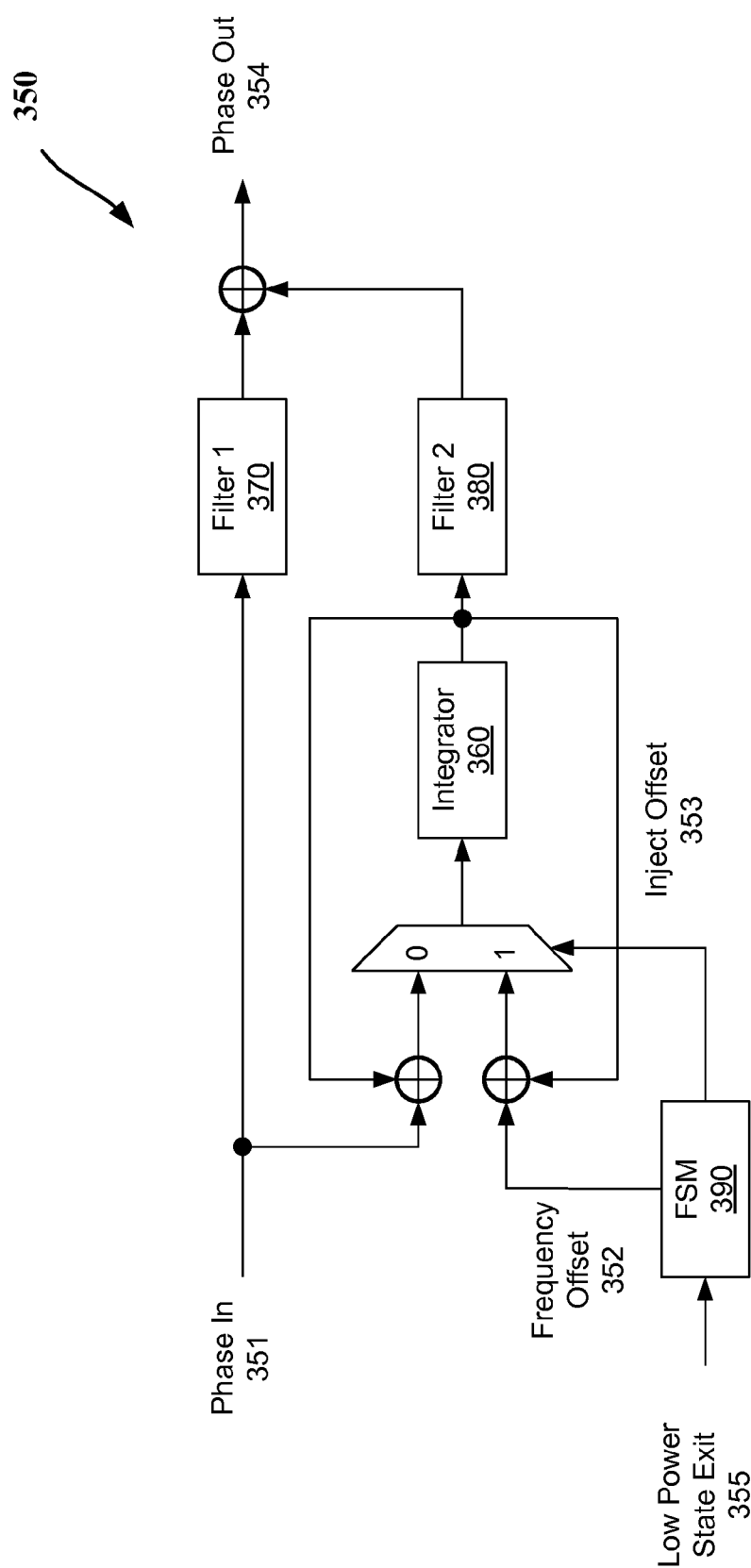
FIG. 3B illustrates a block diagram for a low power state exit Finite State Machine controlled CDR loop filter, according to an embodiment.

In one embodiment, FIG. 3B illustrates a block diagram for a low power state exit FSM controlled CDR loop filter 350. During normal operation, the phase input 351 is sent to the first order filter 370, and the integrator 360, which drives the second order filter 380. The phase output 354 is the summation of Filter 370 and Filter 380. When exiting from low power states, an FSM 390 controls the addition of an artificial frequency offset 352 into the integrator 360 by asserting inject offset 353 to logic "1" for one clock cycle. The amount of frequency offset injected is programmable. If the phase detector is in the dead zone, the phase output will be modulated by the frequency offset to push out of the slow responsive region. Once the phase detector goes back to function, the first order filter will pick up tracking and self correct the injected frequency offset. This is due to the loop gain in Filter 370 is much larger than the gain in Filter 380. The integrator will eventually converge back to its previously value.

Since an embodiment does not rely on the controller's L0s signal to freeze and unfreeze the loops, it also protects loops for certain boundary conditions. One such boundary condition may be that an end point (or agent) enters low power state immediately after entering link-up state while root port is still in recovery due to link errors. In such cases, the signal that is responsible for indication of entering L0s will never be asserted to AFE, as the receiver side of LTSSM never actually enters L0s. An embodiment uses an early indication of entry (into power state) sent by controller instead of the L0s entry signal, and therefore can be more reliably used for freezing the loops. With this scheme, link will have much shorter power management exit latencies and become more stable.

Furthermore, some embodiments provide a safe solution for PCIe/QPI serial I/O AFE designs to achieve fast recovery while exiting power saving states. Moreover, the receiver problems associated with power saving states may be in part due to adaptive loop drift from the operation conditions. The drift is can be caused by error propagation in LMS (Least Mean Squared) adaptation when receive data are corrupted at the beginning of power saving states entry and exit. In extreme scenarios, back-to-back L0s events can be so frequent that there is no time for adaptive loops to recover before entering next power saving mode. Eventually receiver can drift far enough to cause sudden link down. To solve the adaptive loop drift problem in silicon, a digital loop protection FSM can be implemented (e.g., in AFE receiver) to protect loops based on early EIOS indication from controller and sequentially enabling loop adaptation using analog squelch exit detect. Early (EIOS) squelch detection from controller inputs can trigger AFE RX loop protection FSM to ignore potentially corrupted data even when loop adaptation is enabled. This protection mechanism prevents RX from entering erroneous conditions, and staggered unfreeze of CDR followed by AGC, DFE, and CTOC control loops will improve link stability and shorten bit lock time.

During the exit of the low-power state, an embodiment provides a sequential procedure of enabling all the loops to avoid error propagation and shorten bit lock time. When exiting L0s/L1, receive data corruption can arise from large TX phase drift as well as TX common mode drift. Such drifts would trigger erroneous AGC, DFE, and CTOC adaptation, which not only increases the recovery time but also jeopardizes link stability. In one loop protection FSM, CDR loop is first enabled after L0s/L1 exit. Sometimes CDR phase detection becomes less effective in the beginning when the transmit phase is drifted into the dead zone of the CDR during the residency of the low power states. Artificial frequency offset is injected to pull receiver out of those slow responsive regions. Once CDR recovered the sampling phase, the initially injected artificial frequency offset will be automatically cleared due to the CDR loop adaptation. AGC, DFE, and CTOC loops are then turned back on to track the incoming signals and fine tune receiver configuration.

Hence, some embodiments provide for features including one or more of the following: (1) loops are protected from noisy data in robust manner using speculative L0s signal from controller to AFE; (2) unlike loop freeze, unfreeze is done in staggered fashion, CDR will be unfrozen first while keeping the AGC, DFE, and CTOC frozen. After CDR is stabilized using nFTS, the rest of loops (AGC, DFE, CTOC) are unfrozen to track the data for dynamic adjustments. Freezing all loops (CDR, AGC, DFE, CTOC) at the same time using early version of EIOS and unfreeze CDR first using analog Squelch Exit followed AGC/DFE/CTOC unfreeze will provide maximum protection and robust link operation and short L0s exit latencies.

Furthermore, faster recovery is possible in accordance with various embodiments, as the link can start from pre-stored values instead of having to go through fresh training, and use artificial frequency offset during CDR acquisition window to progress through slow responsive phase regions, thereby increasing power saving as the link can stay in lower power state relatively longer. Also, some embodiments improve link stability at exit from low power states and enables power reduction in high speed serial I/O's that use feedback control loops. For example, robust link performance with back-to-back L0s entry and exit (e.g., with L0 state in between with short residency of 400 ns) would be possible by practicing some embodiments. Also, the nFTS value used for power management is generally provided at the beginning of Gen3 training sequence. Some embodiments provide very short (e.g., nFTS of less than 30) L0s exit latency at Gen3 speed.

Figure 4:
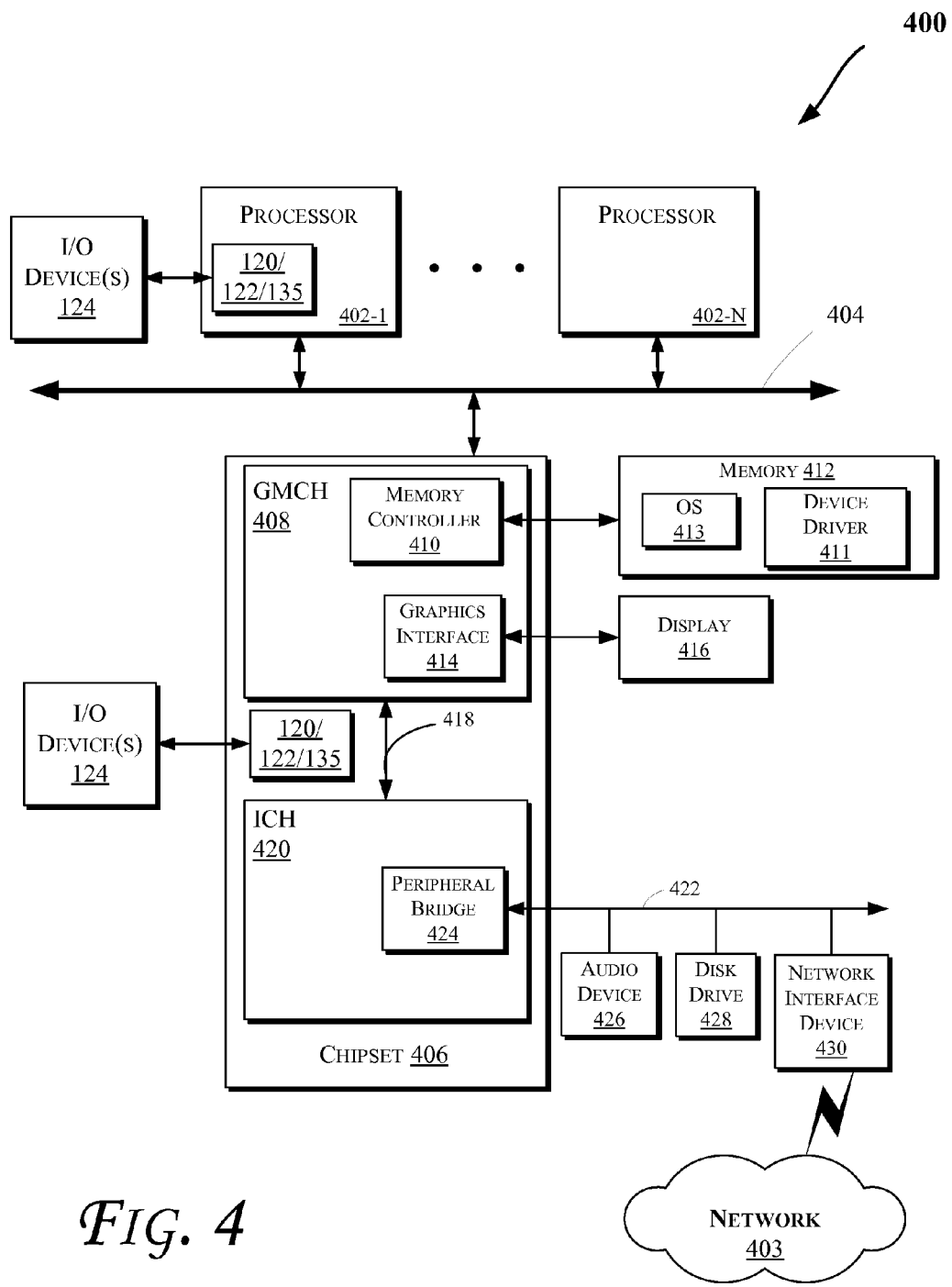
FIG. 4 illustrates a block diagram of an embodiment of a computing system, which can be utilized to implement one or more embodiments discussed herein.

FIG. 4 illustrates a block diagram of a computing system 400 in accordance with an embodiment of the invention. The computing system 400 includes one or more central processing unit(s) (CPUs) 402-1 through 402-N or processors (collectively referred to herein as "processors 402" or more generally "processor 402") that communicate via an interconnection network (or bus) 404. The processors 402 include a general purpose processor, a network processor (that processes data communicated over a computer network 403), or other types of a processor (including a reduced instruction set computer (RISC) processor or a complex instruction set computer (CISC)). Moreover, the processors 402 can have a single or multiple core design. The processors 402 with a multiple core design can integrate different types of processor cores on the same integrated circuit (IC) die. Also, the processors 402 with a multiple core design can be implemented as symmetrical or asymmetrical multiprocessors.

Also, the operations discussed with reference to FIGS. 1-3B are performed by one or more components of the system 400. In some embodiments, the processors 402 can be the same or similar to the processors 202-208 of FIG. 2. Furthermore, the processors 402 (or other components of the system 400) include one or more of the IOH 120, RC 122, and the PCIe Controller 135. Moreover, even though FIG. 4 illustrates some locations for items 120/122/135, these components can be located elsewhere in system 400. For example, I/O device(s) 124 can communicate via bus 422, etc.

A chipset 406 also communicates with the interconnection network 404. The chipset 406 includes a graphics and memory controller hub (GMCH) 408. The GMCH 408 includes a memory controller 410 that communicates with a memory 412. The memory 412 stores data, including sequences of instructions that are executed by the CPU 402, or any other device included in the computing system 400. For example, the memory 412 stores data corresponding to an operation system (OS) 413 and/or a device driver 411 as discussed with reference to the previous figures. In an embodiment, the memory 412 and memory 140 of FIG. 1 can be the same or similar. In one embodiment of the invention, the memory 412 can include one or more volatile storage (or memory) devices such as random access memory (RAM), dynamic RAM (DRAM), synchronous DRAM (SDRAM), static RAM (SRAM), or other types of storage devices. Nonvolatile memory can also be utilized such as a hard disk. Additional devices can also communicate via the interconnection network 404, such as multiple CPUs and/or multiple system memories.

Additionally, one or more of the processors 402 can have access to one or more caches (which include private and/or shared caches in various embodiments) and associated cache controllers (not shown). The cache(s) can adhere to one or more cache coherent protocols. Such cache(s) store data (e.g., including instructions) that are utilized by one or more components of the system 400. For example, the cache locally caches data stored in a memory 412 for faster access by the components of the processors 402. In an embodiment, the cache (that is shared) can include a mid-level cache and/or a last level cache (LLC). Also, each processor 402 can include a level 1 (L1) cache. Various components of the processors 402 can communicate with the cache directly, through a bus or interconnection network, and/or a memory controller or hub.

The GMCH 408 also includes a graphics interface 414 that communicates with a display device 416, e.g., via a graphics accelerator. In one embodiment of the invention, the graphics interface 414 can communicate with the graphics accelerator via an accelerated graphics port (AGP). In an embodiment of the invention, the display 416 (such as a flat panel display) can communicate with the graphics interface 414 through, for example, a signal converter that translates a digital representation of an image stored in a storage device such as video memory or system memory into display signals that are interpreted and displayed by the display 416. In an embodiment, the display signals produced by the display device pass through various control devices before being interpreted by and subsequently displayed on the display 416.

A hub interface 418 allows the GMCH 408 and an input/output control hub (ICH) 420 to communicate. The ICH 420 provides an interface to I/O devices that communicate with the computing system 400. The ICH 420 communicates with a bus 422 through a peripheral bridge (or controller) 424, such as a peripheral component interconnect (PCI) bridge, a universal serial bus (USB) controller, or other types of peripheral bridges or controllers. The bridge 424 provides a data path between the CPU 402 and peripheral devices. Other types of topologies can be utilized. Also, multiple buses can communicate with the ICH 420, e.g., through multiple bridges or controllers. Moreover, other peripherals in communication with the ICH 420 include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 communicates with an audio device 426, one or more disk drive(s) 428, and a network interface device 430 (which is in communication with the computer network 403). Other devices can also communicate via the bus 422. Also, various components (such as the network interface device 430) can communicate with the GMCH 408 in some embodiments of the invention. In addition, the processor 402 and one or more components of the GMCH 408 and/or chipset 406 are combined to form a single integrated circuit chip (or be otherwise present on the same integrated circuit die) in some embodiments.

Furthermore, the computing system 400 includes volatile and/or nonvolatile memory (or storage). For example, nonvolatile memory includes one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
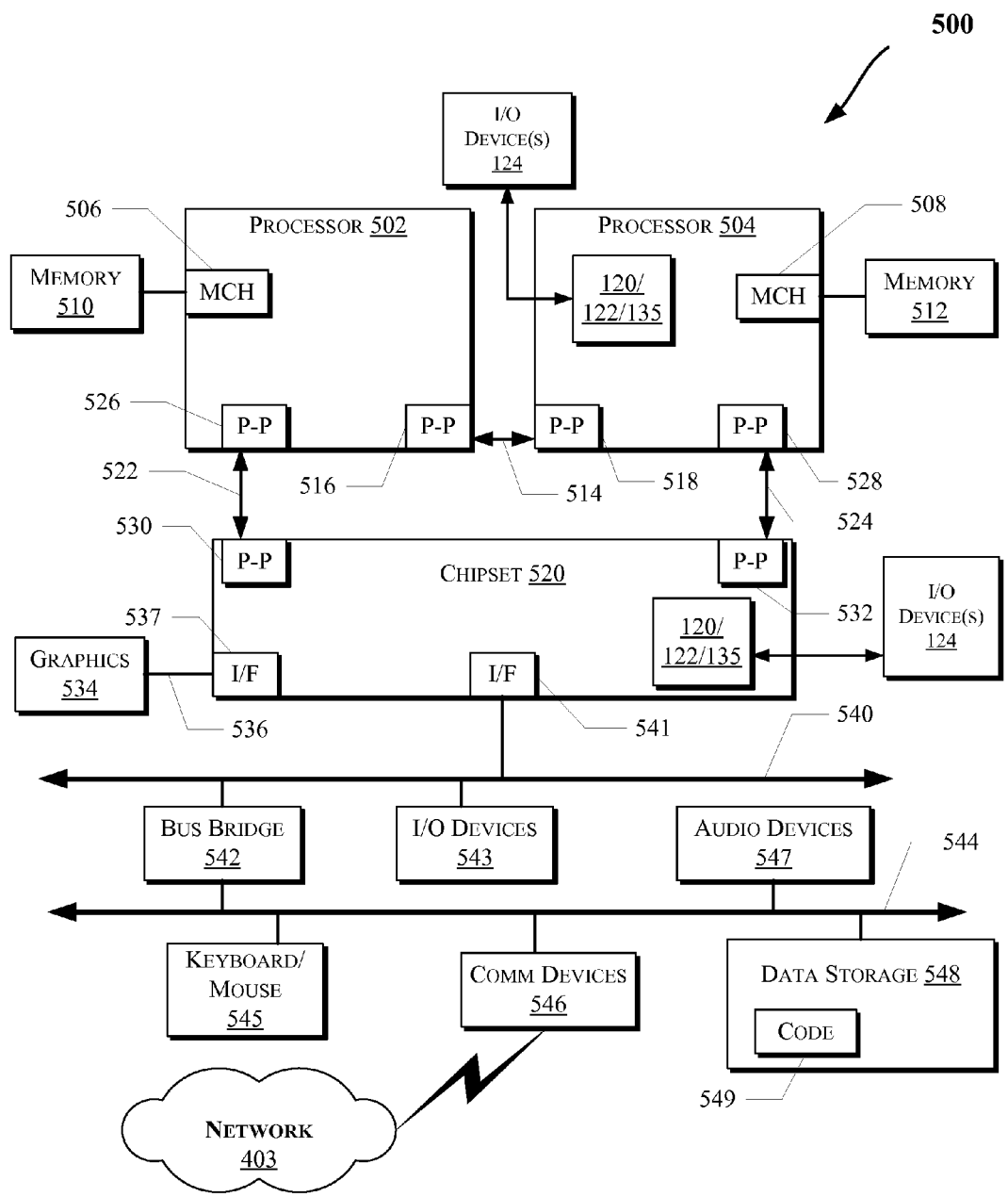
FIG. 5 illustrates a block diagram of an embodiment of a computing system, which can be utilized to implement one or more embodiments discussed herein.

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 are performed by one or more components of the system 500.

As illustrated in FIG. 5, the system 500 includes several processors, of which only two, processors 502 and 504 are shown for clarity. The processors 502 and 504 each include a local memory controller hub (MCH) 506 and 508 to enable communication with memories 510 and 512. The memories 510 and/or 512 store various data such as those discussed with reference to the memory 412 of FIG. 4. As shown in FIG. 5, the processors 502 and 504 also include the cache(s) discussed with reference to FIG. 4 in some embodiments.

In an embodiment, the processors 502 and 504 can be one of the processors 402 discussed with reference to FIG. 4. The processors 502 and 504 exchange data via a point-to-point (PtP) interface 514 using PtP interface circuits 516 and 518, respectively. Also, the processors 502 and 504 each exchange data with a chipset 520 via individual PtP interfaces 522 and 524 using point-to-point interface circuits 526, 528, 530, and 532. The chipset 520 further exchanges data with a high-performance graphics circuit 534 via a high-performance graphics interface 536, e.g., using a PtP interface circuit 537.

At least one embodiment of the invention is provided within the processors 502 and 504 or chipset 520. For example, the processors 502 and 504 and/or chipset 520 include one or more of the IOH 120, RC 122, and the PCIe Controller 135. Other embodiments of the invention, however, exist in other circuits, logic units, or devices within the system 500 of FIG. 5. Furthermore, other embodiments of the invention can be distributed throughout several circuits, logic units, or devices illustrated in FIG. 5. Hence, location of items 120/122/135 shown in FIG. 5 is exemplary and these components may or may not be provided in the illustrated locations.

The chipset 520 communicates with a bus 540 using a PtP interface circuit 541. The bus 540 can have one or more devices that communicate with it, such as a bus bridge 542 and I/O devices 543. Via a bus 544, the bus bridge 542 communicates with other devices such as a keyboard/mouse 545, communication devices 546 (such as modems, network interface devices, or other communication devices that communicate with the computer network 403), audio I/O device, and/or a data storage device 548. The data storage device 548 stores code 549 that is executed by the processors 502 and/or 504.

The following examples pertain to further embodiments. Example 1 includes an apparatus comprising: logic, coupled to a first agent, to detect a first bit pattern that indicates a speculative entry by a second agent into a low power consumption state and to cause freezing of one or more control loops; and logic to detect a second bit pattern that indicates exit from the low power consumption state by the second agent and to cause unfreezing of the one or more control loops. In example 2, the subject matter of example 1 can optionally include an apparatus, wherein the one or more control loops are to comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop. In example 3, the subject matter of example 2 can optionally include an apparatus, wherein the second logic is to cause unfreezing of the CDR control loop prior to the AGC control loop, DFE control loop, and CTOC control loop. In example 4, the subject matter of example 2 can optionally include an apparatus, wherein the second logic is to inject an artificial frequency offset into the CDR control loop to assist fast locking through slow responsive phase regions, prior to enabling the AGC control loop, DFE control loop, and CTOC control loop. In example 5, the subject matter of example 2 can optionally include an apparatus, wherein the second logic is to unfreeze the AGC control loop, DFE control loop, and CTOC control loop in response to expiration of a timer that indicates acquisition of the CDR control loop. In example 6, the subject matter of example 1 can optionally include an apparatus, further comprising logic to determine whether the second agent has in fact entered the low power consumption state after freezing of the one or more control loops and in response to expiration of a timer. In example 7, the subject matter of example 1 can optionally include an apparatus, wherein the link comprises a Peripheral Component Interconnect Express (PCIe) link. In example 8, the subject matter of example 1 can optionally include an apparatus, wherein the first bit pattern is to comprise an EIOS (Electronic Idle Ordered Set) bit pattern. In example 9, the subject matter of example 1 can optionally include an apparatus, wherein the second bit pattern is to comprise an EIEOS (Electronic Idle Exit Ordered Set) bit pattern. In example 10, the subject matter of example 1 can optionally include an apparatus, wherein the first agent is to comprise a PCIe controller. In example 11, the subject matter of example 1 can optionally include an apparatus, wherein the second agent is to comprise an input/output device. In example 12, the subject matter of example 1 can optionally include an apparatus, wherein the first agent and the second agent are to be coupled via a link. In example 13, the subject matter of example 12 can optionally include an apparatus, wherein the link is to comprise a point-to-point coherent interconnect. In example 14, the subject matter of example 1 can optionally include an apparatus, wherein the first agent is to comprise one or more of the logic to detect the first bit pattern and the logic to detect the second bit pattern. In example 15, the subject matter of example 1 can optionally include an apparatus, wherein one or more of the first agent, the second agent, and memory are on a same integrated circuit chip.

In example 16, a method comprises: detecting, at a first agent, a first bit pattern that indicates a speculative entry by a second agent into a low power consumption state and to cause freezing of one or more control loops; and detecting a second bit pattern that indicates exit from the low power consumption state by the second agent and to cause unfreezing of the one or more control loops. In example 17, the subject matter of example 16 can optionally include a method, wherein the one or more control loops comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop. In example 18, the subject matter of example 17 can optionally include a method, wherein detecting the second bit patter causes unfreezing of the CDR control loop prior to the AGC control loop, DFE control loop, and CTOC control loop. In example 19, the subject matter of example 17 can optionally include a method, wherein detecting the second bit patter causes injection of an artificial frequency offset into the CDR control loop to assist fast locking through slow responsive phase regions, prior to enabling the AGC control loop, DFE control loop, and CTOC control loop. In example 20, the subject matter of example 17 can optionally include a method, wherein detecting the second bit patter causes unfreezing of the AGC control loop, DFE control loop, and CTOC control loop in response to expiration of a timer that indicates acquisition of the CDR control loop.

Example 21 includes a system comprising: a processor having a first agent and a second agent; and logic to detect a first bit pattern that indicates a speculative entry by the second agent into a low power consumption state and to cause freezing of one or more control loops; and logic to detect a second bit pattern that indicates exit from the low power consumption state by the second agent and to cause unfreezing of the one or more control loops. In example 22, the subject matter of example 21 can optionally include a system, wherein the one or more control loops are to comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop. In example 23, the subject matter of example 22 can optionally include a system, wherein the logic to detect the second bit pattern is to cause unfreezing of the CDR control loop prior to the AGC control loop, DFE control loop, and CTOC control loop. In example 24, the subject matter of example 22 can optionally include a system, wherein the logic to detect the second bit pattern is to inject an artificial frequency offset into the CDR control loop to assist fast locking through slow responsive phase regions, prior to enabling the AGC control loop, DFE control loop, and CTOC control loop. In example 25, the subject matter of example 22 can optionally include a system, wherein the logic to detect the second bit pattern is to unfreeze the AGC control loop, DFE control loop, and CTOC control loop in response to expiration of a timer that indicates acquisition of the CDR control loop. In example 26, the subject matter of example 21 can optionally include a system, further comprising logic to determine whether the second agent has in fact entered the low power consumption state after freezing of the one or more control loops and in response to expiration of a timer. In example 27, the subject matter of example 21 can optionally include a system, wherein the link comprises a Peripheral Component Interconnect Express (PCIe) link. In example 28, the subject matter of example 21 can optionally include a system, wherein the first bit pattern is to comprise an EIOS (Electronic Idle Ordered Set) bit pattern. In example 29, the subject matter of example 21 can optionally include a system, wherein the second bit pattern is to comprise an EIEOS (Electronic Idle Exit Ordered Set) bit pattern. In example 30, the subject matter of example 21 can optionally include a system, wherein the first agent is to comprise a PCIe controller. In example 31, the subject matter of example 21 can optionally include a system, wherein the second agent is to comprise an input/output device. In example 32, the subject matter of example 21 can optionally include a system, wherein the first agent and the second agent are to be coupled via a link. In example 33, the subject matter of example 21 can optionally include a system, wherein the first agent is to comprise one or more of the logic to detect the first bit pattern and the logic to detect the second bit pattern. In example 34, the subject matter of example 21 can optionally include a system, wherein one or more of the first agent, the second agent, and memory are on a same integrated circuit chip.

Example 35 includes an apparatus to provide fast and robust recovery from low-power states in high speed serial links, the apparatus comprising: means for detecting, at a first agent, a first bit pattern that indicates a speculative entry by a second agent into a low power consumption state and to cause freezing of one or more control loops; and means for detecting a second bit pattern that indicates exit from the low power consumption state by the second agent and to cause unfreezing of the one or more control loops. In example 36, the subject matter of example 35 can optionally include an apparatus, wherein the one or more control loops comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop. In example 37, the subject matter of example 36 can optionally include an apparatus, wherein the means for detecting the second bit patter causes unfreezing of the CDR control loop prior to the AGC control loop, DFE control loop, and CTOC control loop. In example 38, the subject matter of example 36 can optionally include an apparatus, wherein the means for detecting the second bit patter causes injection of an artificial frequency offset into the CDR control loop to assist fast locking through slow responsive phase regions, prior to enabling the AGC control loop, DFE control loop, and CTOC control loop. In example 39, the subject matter of example 36 can optionally include an apparatus, wherein the means for detecting the second bit patter causes unfreezing of the AGC control loop, DFE control loop, and CTOC control loop in response to expiration of a timer that indicates acquisition of the CDR control loop.

In example 40, a computer-readable medium comprising one or more instructions that when executed on a processor configure the processor to perform one or more operations of any of examples 16 to 20. In example 41, the subject matter of examples 1 to 15 can optionally include an apparatus, wherein a processor is to comprise the first agent and the second agent. In example 42, the subject matter of examples 16 to 20 can optionally include a method, wherein a processor is to comprise the first agent and the second agent.

In various embodiments of the invention, the operations discussed herein, e.g., with reference to FIGS. 1-5, can be implemented as hardware (e.g., circuitry), software, firmware, microcode, or combinations thereof, which can be provided as a computer program product, e.g., including a tangible (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program is transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   first logic, coupled to a first agent, to detect a first bit pattern that indicates a speculative entry of a second agent into a low power consumption state and to cause freezing of one or more control loops; and
   second logic to detect a second bit pattern that indicates exit from the low power consumption state by the second agent and to cause unfreezing of the one or more control loops, wherein the second logic is to cause unfreezing of all of the one or more control loops in response to detection of the second bit pattern and a determination that that the second agent has not entered the low power consumption state.

2. The apparatus of claim 1, wherein the one or more control loops are to comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop.

3. The apparatus of claim 1, wherein the one or more control loops are to comprise a plurality of control loops and wherein the second logic is to cause unfreezing of a CDR control loop prior to an AGC control loop, a DFE control loop, and a CTOC control loop.

4. The apparatus of claim 1, wherein the one or more control loops are to comprise a plurality of control loops and wherein the second logic is to inject an artificial frequency offset into a CDR control loop to assist fast locking through slow responsive phase regions, prior to enabling an AGC control loop, a DFE control loop, and a CTOC control loop.

5. The apparatus of claim 1, wherein the one or more control loops are to comprise a plurality of control loops and wherein the second logic is to unfreeze an AGC control loop, a DFE control loop, and a CTOC control loop in response to expiration of a timer that indicates acquisition of a CDR control loop.

6. The apparatus of claim 1, further comprising logic to determine whether the second agent has in fact entered the low power consumption state after freezing of the one or more control loops and in response to expiration of a timer.

7. The apparatus of claim 1, wherein the first agent and the second agent are to be coupled via a link and wherein the link comprises a Peripheral Component Interconnect Express (PCIe) link.

8. The apparatus of claim 1, wherein the first bit pattern is to comprise an EIOS (Electronic Idle Ordered Set) bit pattern.

9. The apparatus of claim 1, wherein the second bit pattern is to comprise an EIEOS (Electronic Idle Exit Ordered Set) bit pattern.

10. The apparatus of claim 1, wherein the first agent is to comprise a PCIe controller.

11. The apparatus of claim 1, wherein the second agent is to comprise an input/output device.

12. The apparatus of claim 1, wherein the first agent and the second agent are to be coupled via a link.

13. The apparatus of claim 12, wherein the link is to comprise a point-to-point coherent interconnect.

14. The apparatus of claim 1, wherein the first agent is to comprise one or more of the logic to detect the first bit pattern and the logic to detect the second bit pattern.

15. The apparatus of claim 1, wherein one or more of the first agent, the second agent, and memory are on a same integrated circuit chip.

16. The apparatus of claim 1, wherein the first bit pattern is to comprise at least four symbols, wherein the at least four symbols are to comprise "com idle idle idle" or a first four EIOS (Electronic Idle Ordered Set) symbols.

17. The apparatus of claim 1, wherein the one or more control loops are to comprise a plurality of control loops and wherein the second logic is to cause unfreezing of a CDR control loop prior to an AGC control loop, a DFE control loop, and a CTOC control loop in response to detection of the second bit pattern and a determination that the second agent has entered the low power consumption state.

18. A method comprising:
  detecting, at a first agent, a first bit pattern that indicates a speculative entry of a second agent into a low power consumption state and to cause freezing of one or more control loops; and
  detecting a second bit pattern that indicates exit from the low power consumption state by the second agent and to cause unfreezing of the one or more control loops, wherein the second logic causes unfreezing of all of the one or more control loops in response to detection of the second bit pattern and a determination that that the second agent has not entered the low power consumption state.

19. The method of claim 18, wherein the one or more control loops comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop.

20. The method of claim 18, wherein the one or more control loops comprise a plurality of control loops and wherein detecting the second bit pattern causes unfreezing of a CDR control loop prior to an AGC control loop, a DFE control loop, and a CTOC control loop.

21. The method of claim 18, wherein the one or more control loops comprise a plurality of control loops and wherein detecting the second bit pattern causes injection of an artificial frequency offset into a CDR control loop to assist fast locking through slow responsive phase regions, prior to enabling an AGC control loop, a DFE control loop, and a CTOC control loop.

22. The method of claim 18, wherein the one or more control loops comprise a plurality of control loops and wherein detecting the second bit pattern causes unfreezing of an AGC control loop, a DFE control loop, and a CTOC control loop in response to expiration of a timer that indicates acquisition of a CDR control loop.

23. A system comprising:
  a processor having a first agent and a second agent; and
  first logic to detect a first bit pattern that indicates a speculative entry of the second agent into a low power consumption state and to cause freezing of one or more control loops; and
  second logic to detect a second bit pattern that indicates exit from the low power consumption state by the second agent and to cause unfreezing of the one or more control loops, wherein the second logic is to cause unfreezing of all of the one or more control loops in response to detection of the second bit pattern and a determination that that the second agent has not entered the low power consumption state.

24. The system of claim 23, wherein the one or more control loops are to comprise one or more of: a CDR (Clock Data Recovery) control loop, an AGC (Automatic Gain Control) control loop, a DFE (Decision Feedback Equalization) control loop, and a CTOC (Continuous Time Offset Cancellation) control loop.

25. The system of claim 23, wherein the one or more control loops are to comprise a plurality of control loops and wherein the logic to detect the second bit pattern is to cause unfreezing of a CDR control loop prior to an AGC control loop, a DFE control loop, and a CTOC control loop.

26. The system of claim 23, wherein the one or more control loops are to comprise a plurality of control loops and wherein the logic to detect the second bit pattern is to inject an artificial frequency offset into a CDR control loop to assist fast locking through slow responsive phase regions, prior to enabling an AGC control loop, a DFE control loop, and a CTOC control loop.

27. The system of claim 23, wherein the one or more control loops are to comprise a plurality of control loops and wherein the logic to detect the second bit pattern is to unfreeze an AGC control loop, a DFE control loop, and a CTOC control loop in response to expiration of a timer that indicates acquisition of a CDR control loop.

* * * * *